| United States Patent [19] | [11] | 4,431,516 |
|---|---|---|
| Baird et al. | [45] | Feb. 14, 1984 |

[54] HYDROCRACKING PROCESS

[75] Inventors: Michael J. Baird; Jeffrey T. Miller, both of Naperville; L. Charles Gutberlet, Wheaton, all of Ill.

[73] Assignee: Standard Oil Company (Indiana), Chicago, Ill.

[21] Appl. No.: 320,864

[22] Filed: Nov. 13, 1981

[51] Int. Cl.³ .............................................. C10G 47/20
[52] U.S. Cl. ..................................... 208/111; 208/114
[58] Field of Search ................................ 208/114, 111

[56] References Cited

U.S. PATENT DOCUMENTS

| 3,169,106 | 2/1965 | LeFrancois et al. | 208/111 |
|---|---|---|---|
| 3,354,096 | 11/1967 | Young | 208/111 X |
| 3,493,517 | 2/1970 | Jaffe | 208/254 H |
| 3,507,778 | 4/1970 | Gladrow et al. | 208/111 |
| 3,755,150 | 8/1973 | Mickelson | 208/216 R |
| 3,761,397 | 9/1973 | Gatti | 208/143 |
| 3,778,365 | 12/1973 | Hamner et al. | 208/111 |
| 3,867,279 | 2/1975 | Young | 208/114 |
| 3,897,365 | 7/1975 | Feins et al. | 208/254 H |
| 4,326,947 | 4/1982 | Sawyer et al. | 208/111 |
| 4,327,236 | 4/1982 | Klotz | 585/481 |

*Primary Examiner*—Delbert E. Gantz
*Assistant Examiner*—O. Chaudhuri
*Attorney, Agent, or Firm*—James R. Henes; William T. McClain; William H. Magidson

[57] ABSTRACT

A process for hydrocracking gas oil boiling range hydrocarbon feeds comprising contacting the feed with hydrogen under hydrocracking conditions in the presence of a catalyst comprising an active metallic component comprising at least one metal having hydrogenation activity and at least one oxygenated phosphorus component, and a support component comprising at least one non-zeolitic, porous refractory inorganic oxide matrix component and at least one crystalline molecular sieve zeolite component.

9 Claims, No Drawings

4,431,516

HYDROCRACKING PROCESS

BACKGROUND OF THE INVENTION

This invention relates to a process for hydrocracking gas oil boiling range hydrocarbon feeds to gasoline boiling range products.

Hydrocracking of hydrocarbon feeds to gasoline boiling range products is well known and typically involves contacting a feed with hydrogen under hydrocracking conditions in the presence of catalysts having activity for both hydrogenation and cracking reactions whereby saturation of aromatic feed components, formation of easily removable contaminant-containing products such as water, hydrogen sulfide and ammonia, and cracking of higher boiling feed components to lower boiling products take place.

Typical hydrocracking catalysts contain a hydrogenating metal component such as an oxide or sulfide of a Group VIB or VIII metal deposed on a cracking support such as silica-alumina or a crystalline molecular sieve zeolite. For example, U.S. Pat. No. 3,649,523 (Bertolacini et al.) discloses hydrocracking in the presence of catalysts containing a combination of Group VIB and VIII metals and/or oxides and/or sulfides thereof as the hydrogenating component and a combination of a large-pore, crystalline aluminosilicate component and a porous component such as alumina, aluminum phosphate or silica as the support component. U.S. Pat. Nos. 3,894,930 and 4,054,539 (both Hensley) disclose hydrocracking catalysts comprising oxides of cobalt and molybdenum supported on large-pore crystalline aluminosilicate and silica-alumina.

In copending commonly assigned application Ser. No. 200,536 of Tait et al. filed Oct. 24, 1980, improved catalysts and processes for hydrogen processing hydrocarbon feeds, particularly those of high nitrogen content, are disclosed and claimed. The process of that application involves contacting feed with hydrogen in the presence of a catalyst of improved thermal stability comprising a chromium component, a molybdenum component and at least one Group VIII metal component, and a support component comprising a porous refractory inorganic oxide component and a crystalline molecular sieve zeolite component.

In copending, commonly assigned application Ser. No. 320,866 filed concurrently herewith, Hensley et al. disclose and claim improved catalytic compositions having utility in a wide range of hydrocarbon conversion reactions comprising an active metallic component comprising at least one metal having hydrocarbon conversion activity and at least one oxygenated phosphorus component, and a support component comprising at least one non-zeolitic refractory inorganic oxide matrix component and at least one crystalline molecular sieve zeolite component.

We have now found that certain catalytic compositions according to the aforesaid Hensley et al. application give particularly good results in hydrocracking of gas oil boiling range hydrocarbon feeds. Accordingly, it is an object of this invention to provide an improved process for hydrocracking gas oil boiling range hydrocarbon feeds to gasoline boiling range products. A further object is to provide a process for hydrocracking of such feeds in the presence of the aforesaid catalysts. Other objects of the invention will be apparent to persons skilled in the art from the following description and the appended claims.

In connection with the present invention, it should be noted that phosphorus has been included in the hydrogenating component of catalysts employed in hydrotreating process not involving cracking. For example, U.S. Pat. No. 3,446,730 (Kerns et al.) and U.S. Pat. No. 3,749,664 (Mickelson) disclose phosphorus-promoted denitrogenation catalysts. Commonly assigned copending application Ser. No. 231,757 of Miller filed Feb. 5, 1981, discloses hydrotreating catalysts comprising a hydrogenating component comprising a chromium component, at least one other Group VIB metal component, at least one Group VIII metal component and a phosphorus component supported on a porous refractory inorganic oxide component. Particularly good results are attained on denitrogenation processes. The cited patents and application do not disclose that phosphorus can be employed to improve performance of hydrocracking catalysts.

DESCRIPTION OF THE INVENTION

Briefly the process of this invention comprises contacting a gas oil boiling range hydrocarbon feed with hydrogen under hydrocracking conditions in the presence of a catalyst comprising an active metallic component comprising at least one metal having hydrogenation activity and at least oxygenated phosphorus component, and a support component comprising at least one non-zeolitic porous refractory inorganic oxide matrix component and at least one crystalline molecular sieve zeolite component.

In greater detail, hydrocarbon feed materials employed according to the present invention are gas oil boiling range hydrocarbons derived from petroleum or synthetic crude oils, coal liquids or biomass liquids. Preferred feeds are those boiling from about 400° to about 1000° F. and containing up to about 0.1 wt% nitrogen and/or up to about 2 wt% sulfur. Specific examples of preferred gas oil boiling range feeds include petroleum and synthetic crude oil distillates such as catalytic cycle oils, virgin gas oil boiling range hydrocarbons and mixtures thereof.

Hydrocracking conditions employed according to the present invention vary somewhat depending on the choice of feed and severity of hydrocracking desired. Broadly, conditions include temperatures ranging from about 650° to about 850° F., total pressures ranging from about 1000 to about 3000 psi, hydrogen partial pressures ranging from about 300 to about 2500 psi, linear hourly space velocities (LHSV) ranging from about 0.2 to about 10 reciprocal hours and hydrogen recycle rates ranging from about 5,000 to about 20,000 standard cubic feet per barrel of feed (SCFB). Hydrogen consumption broadly ranges from about 500 to about 3000 SCFB under such conditions. Preferred conditions in hydrocracking of catalytic cycle oils, virgin gas oils, and combinations thereof to gasoline boiling range products include a temperature ranging from about 675° to about 775° F., total pressure of about 1500 to about 2500 psi, hydrogen partial pressure of about 1000 to about 1500 psi, space velocity of about 0.5 to about 4 reciprocal hours and hydrogen recycle rate of about 10,000 to about 15,000 SCFB, with hydrogen consumption ranging from about 1000 to about 2000 SCFB.

The process of this invention can be conducted in either fixed or expanded bed operations using a single reactor or series thereof as desired.

The catalysts employed according to the process of this invention exhibit high activity for both hydrogenation and cracking. The catalyst comprises an active metallic component comprising at least one metal having hydrogenation activity and at least one oxygenated phosphorus component, and a support component comprising at least one non-zeolitic porous refractory inorganic oxide matrix component and at least one crystalline molecular sieve zeolite component. Content of the active metallic component and the support component in the catalyst are not critical so long as the catalyst contains at least a catalytically effective amount of metallic and cracking components. Usefully, about 5 to about 50 wt% of total catalyst weight is made up of active metallic component and about 50 to about 95 wt% is made up of the support component.

Useful hydrogenating metals contained in the active metallic component of the catalyst employed according to the invented process are metals of Groups VIB and VIII, specific examples of which include chromium, molybdenum, tungsten, iron, cobalt, nickel, ruthenium, rhodium, palladium, osmium, iridium and platinum. Combinations of these also can be employed if desired and often give particularly good results. These metals can be present in the hydrogenating component in the form of elements, as oxides or sulfides, or as combinations thereof.

The active metallic component of the catalysts employed in the process of this invention also contains at least one oxygenated phosphorus component which may be present in a variety of forms such as simple oxides, phosphate anions, complex species in which phosphorus is linked through oxygen to one or more metals of the active metallic component or compounds of such metal or metals, or combinations of these.

Content of the metal and phosphorus components of the active metallic component are not critical so long as phosphorus component content is at least effective to promote hydrogenating activity of the hydrogenating metal or metals. On the basis of total catalyst weight, hydrogenating metal or metals make up about 5 to about 30 wt% of the overall catalyst weight, calculated as metal oxides, e.g., $Cr_2O_3$, $MoO_3$, $WO_3$, $CoO$, $NiO$, while phosphorus component, calculated as $P_2O_5$, makes up about 0.1 to about 10 wt% of overall catalyst weight.

The support component of the catalysts employed according to this invention comprise at least one non-zeolitic porous refractory inorganic oxide matrix component and at least one crystalline molecular sieve zeolite component. Suitable non-zeolitic matrix components are well known to persons skilled in the art and include alumina, silica, zirconia, titania, magnesia, silica-alumina and various other combinations of refractory metal oxides. The matrix component also can include adjuvants such as one or more oxides of phosphorus or boron, or a halogen such as chlorine or fluorine.

The crystalline molecular sieve zeolite component of the catalyst is a zeolitic material derived from an acid-tolerant crystalline molecular sieve zeolite, i.e., one that retains substantial crystallinity on exposure to phosphoric acid at a pH down to about 3 to 4 and contains sufficiently low levels of metals capable of reacting with phosphoric acid to form insoluble metal phosphates as to avoid plugging of pores of the support component with such insoluble metal phosphates. Examples of such acid-tolerant crystalline molecular sieve zeolites include mordenite type crystalline aluminosilicate zeolites; faujasite-type crystalline aluminosilicate zeolites selected from ultrastable Y-type crystalline aluminosilicate zeolites and Y-type crystalline aluminosilicate zeolites in acid or in ammonium form; ZSM-type crystalline aluminosilicate zeoltes; and AMS-type crystalline borosilicate zeolites. Y-type zeolites in ammonium form are converted to acid form during catalyst preparation. Preferred crystalline molecular sieve zeolite components of the catalysts used according to this invention are the ultrastable Y-type crystalline aluminosilicate zeolites such as that designated Z-14US as described in detail in U.S. Pat. No. 3,293,192 (Maher et al.) and U.S. Pat. No. 3,449,070 (McDaniel et al.), both of which are incorporated herein by reference.

Concentrations of the matrix component and the zeolite component in the support component of the catalysts employed according to this invention are not critical so long as there is sufficient zeolite component to provide cracking activity. Preferably, matrix component content is at least effective to give the support component sufficient strength and integrity that the ultimate catalyst composition can be employed in hydrocracking according to this invention without appreciable damage to the catalyst. Usefully, matrix component content ranges from about 5 to about 95 wt% of the support while zeolite content ranges from about 5 to about 95 wt% of the support component.

Preferably, the support component of the catalyst employed according to this invention is in the form of a dispersion of the zeolite component in the matrix component. Such dispersions can be prepared by well known techniques such as by blending the zeolitic component, preferably in finely divided form, into a sol, hydrosol or hydrogel of an inorganic oxide and then adding a gellig medium such as ammonium hydroxide and stirring to produce a gel. Alternatively, the zeolite component is blended into a slurry of the matrix component. In either case, the result can be dried, shaped if desired, and then calcined to form the final support component. A less preferred, but still suitable, method for preparing a suitable dispersion of crystalline molecular sieve zeolite component in the matrix component is to dryblend particles of each, preferably in finely divided form, and then conduct any desired shaping operations.

A preferred method for preparing the catalysts employed according to the present invention comprises impregnation of a support component comprising at least one non-zeolitic porous refractory inorganic oxide matrix component and at least one acid-tolerant, crystalline molecular sieve zeolite component with precursors to the metallic component comprising at least one metal having hydrogenating activity and at least one oxygenated phosphorus component under conditions effective to avoid substantial destruction of zeolite crystallinity, followed by calcining the result to convert the precursors to the metallic component to active form.

It also is contemplated to impregnate the porous, refractory inorganic oxide matrix component of the support component with precursors to the metallic component and then blend the zeolite component of the support component with the impregnated material. Blending can be conducted before or after calcination. Accordingly, the present invention contemplates the use of catalysts in which the active metallic component is deposed on either the porous matrix component of the support component or on a dispersion of zeolitic component in the matrix component.

In general, the mechanics and conditions of the preparation are in accordance with well known impregnation techniques except that when a phosphorus component precursor containing or capable of liberating phosphate anions, e.g. phosphoric acid or salts thereof, is used care must be taken to insure that the impregnation is conducted at a pH of at least about 2 in order to avoid substantial destruction of zeolite crystallinity. More preferably, pH of such impregnating solutions ranges from about 2.5 to about 6 to insure substantial retention of crystallinity as well as the desired association of the phosphorus and metal components of the active metallic component. Of course, depending on the specific zeolite employed in preparation of a given catalyst, the optimum pH range may vary somewhat.

Further details with respect to the catalysts employed according to the process of the present invention are found in the aforesaid application Ser. No. 320,866 of Hensley et al. filled concurrently herewith, which application is incorporated herein by reference.

Catalysts according to Hensley et al. that are preferred for use in the hydrocracking process of the present invention are those in which the active metallic component comprises at least one metal of Group VIB or VIII, the non-zeolitic matrix component comprises alumina, or silica-alumina and the crystalline molecular sieve zeolite component comprises a low sodium, ultrastable Y-type crystalline aluminosilicate zeolite, as these exhibit high activity for hydrogenation and cracking over prolonged periods of time. More preferably, the hydrogenation metal of the active metallic component is nickel, cobalt, chromium, molybdenum or tungsten or a combination thereof and is present in an amount ranging from about 8 to about 25 wt%, calculated as metal oxide and based on total catalyst weight. Preferred support compositions contain about 40 to about 80 wt% alumina or silica alumina having dispersed therein about 20 to about 60 wt% low sodium, ultrastable Y-type crystalline aluminosilicate zeolite.

More preferably, the hydrogenating metal of the active metallic component of the catalyst employed according to this invention comprises a combination of cobalt and molybdenum, nickel and molybdenum or nickel and tungsten. Best results are attained using catalysts containing about 0.5 to about 6 wt% oxygenated phosphorus component, calculated as $P_2O_5$ and a hydrogenating component containing about 1 to about 4 wt%, CoO or NiO and about 8 to about 15 wt% $MoO_3$; or about 1 to about 4 wt% NiO and about 15 to about 25 wt% $WO_3$; and a support comprising about 50 to about 70 wt% alumina or silica-alumina having dispersed therein about 30 to about 50 wt% low sodium ultrastable Y-type crystalline aluminosilicate zeolite component, such weight percentages of hydrogenating metal oxides being based on total catalyst weight, and such matrix and zeolite weight percentages being based on support weight.

The present invention is described in further detail in connection with the following example, it being understood that the same is for purposes of illustration and not limitation.

EXAMPLE

The catalysts prepared in Examples 3 and 4 of commonly assigned, copending application Ser. No. 320,866 of Hensley et al. filed concurrently herewith, were tested for hydrocracking activity in a vertical, tubular, downflow reactor having a length of 19½" and inner diameter of 0.55" and equipped with a pressure gauge and DP cell to control hydrogen flow and a high pressure separator for removal of products. The reactor was loaded with 18.75 g catalyst, immersed in a molten salt-containing heating jacket at 500° F. and pressured to 1250 psi with hydrogen. Temperature was held at 500° F. for two hours and then feed was pumped to the reactor with a Milton Roy pump. Temperature was slowly increased to 680° F., held there overnight and then increased to operating temperature of 710°–730° F. Feed rate (LHSV) was 1–2 hours$^{-1}$. Runs were conducted for two weeks with periodic sampling.

The feed used in all runs was a mixture of 70 wt% light catalytic cycle oil and 30 wt% light virgin gas oil having the following properties:

| API Gravity (°) | 25.3 |
|---|---|
| Nitrogen (ppm) | 304 |
| Sulfur (wt %) | 1.31 |
| Initial Boiling Point (°F.) | 404 |
| Final Boiling Point (°F.) | 673 |

Catalyst 3 contained 2.36 wt% CoO, 9.13 wt% $MoO_3$, 2.3 wt% oxygenated phosphorus component, calculated as $P_2O_5$, and a support containing 41 wt% ultrastable Y-type crystalline aluminosilicate zeolite dispersed in 59 wt% silica-alumina. Catalyst 4 contained 2.6 wt% CoO, 9.6 wt% $MoO_3$, 0.6 wt% oxygenated phosphorus component, calculated as $P_2O_5$, and a support containing 35 wt% ultrastable Y-type crystalline aluminosilicate zeolite dispersed in 65 wt% silica-alumina. In addition to the runs conducted using the catalysts of Examples 3 and 4 of Hensley et al., comparative runs were conducted using comparative catalysts A-C which are described below:

(A) 2.5 wt% CoO and 10.2 wt% $MoO_3$ supported on a dispersion of of 35 wt%, ultrastable Y-type crystalline aluminosilicate zeolite in 65 wt% alumina and prepared substantially according to the procedure of Example 3 of Hensley et al;

(B) commercial hydrocracking catalyst containing 2.63 wt% CoO and 10.5 wt% $MoO_3$ supported on the ultrastable Y-type zeolite-silica-alumina base described in Catalyst 3 above;

(C) 2.6 wt% CoO and 10.0 wt% $MoO_3$ supported on a dispersion of 35 wt%, ultrastable Y-type crystalline aluminosilicate zeolite (Davison) in 65 wt% alumina and prepared substantially according to the procedure of Example 4 of Hensley et al.

Hydrocracking activities of the catalysts were determined on the basis of temperature required to convert 77 wt% of the feed to gasoline boiling range products (up to 380° F.). Activities relative to comparative catalyst C are reported in the following table.

TABLE

| CATALYST | RELATIVE ACTIVITY | INCREASE (%) |
|---|---|---|
| A | 102 | 2 |
| B | 126 | 26 |
| 3 | 144 | 44 |
| C | 100 | — |
| 4 | 138 | 38 |

As can be seen from the table, the process of the invention, employing phosphorus-promoted, zeolite-containing catalysts 3 and 4 showed about 40% higher activity than the standard catalyst (C) as well as catalyst A, and 12–18% higher activity than catalyst B.

We claim:

1. A process for hydrocracking gas oil boiling range hydrocarbon feeds comprising contacting the feed with hydrogen under hydrocracking conditions in the presence of a catalyst comprising an active metallic component comprising at least one metal having hydrogenation activity and at least one oxygenated phosphorus component, and a support component consisting essentially of at least one non-zeolitic, porous refractory inorganic oxide matrix component selected from the group consisting of alumina, silica, zirconia, titania, magnesia and combinations thereof are at least one crystalline molecular sieve zeolite component, wherein the gas oil boiling range feed boils at about 400° to about 1000° F. and contains up to about 0.1 wt% nitrogen and up to about 2 wt% sulfur, and wherein the hydrocracking conditions comprise a temperature of from about 650° F. to about 850° F. and a total pressure of from about 1000 psi to about 3000 psi.

2. The process of claim 1 wherein the crystalline molecular sieve zeolite component comprises an ultrastable Y-type crystalline aluminosilicate zeolite.

3. The process of claim 2 wherein hydrocracking conditions comprise a temperature of about 650° to about 850° F., total pressure of about 1000 to about 3000 psi, hydrogen partial pressure of about 300 to about 2500 psi, LHSV of about 0.2 to about 10 hour$^{-1}$ and hydrogen recycle rate of about 5,000 to about 20,000 SCFB.

4. The process of claim 2 wherein the hydrogenation metal of the active metallic component comprises at least one metal of Group VIB or VIII.

5. The process of claim 4 wherein the hydrogenating metal of the active metallic component comprises a combination of cobalt and molybdenum, nickel and molybdenum or nickel and tungsten.

6. The process of claim 5 wherein the non-zeolitic, porous refractory inorganic oxide matrix component comprises alumina, or silica-alumina.

7. The process of claim 6 wherein the active metallic component is deposed on the porous refractory inorganic oxide matrix component of the support component.

8. The process of claim 6 wherein the active metallic component is deposed on a dispersion of ultrastable Y-type zeolite in alumina or silica-alumina.

9. The process of any of claims 1, 2, 3, 4, 5, 6, 7 or 8 wherein the gas oil boiling range feed comprises a catalytic cycle oil, a virgin gas oil boiling range hydrocarbon or a combination thereof.

* * * * *